US007110211B2

(12) United States Patent
Sueki et al.

(10) Patent No.: US 7,110,211 B2
(45) Date of Patent: Sep. 19, 2006

(54) MAGNETIC TAPE, MAGNETIC TAPE CARTRIDGE, MAGNETIC TAPE DRIVE, AND METHOD FOR RECORDING DATA ON MAGNETIC TAPE

(75) Inventors: Minoru Sueki, Odawara (JP); Tetsuji Nishida, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/962,442

(22) Filed: Oct. 13, 2004

(65) Prior Publication Data

US 2005/0117246 A1    Jun. 2, 2005

(30) Foreign Application Priority Data

Dec. 2, 2003   (JP) .............................. 2003-403405

(51) Int. Cl.
*G11B 5/584*   (2006.01)
*G11B 19/02*   (2006.01)

(52) U.S. Cl. ..................................... 360/77.12; 360/69
(58) Field of Classification Search ............ 360/77.12, 360/77.13
See application file for complete search history.

(56) References Cited

U.S. PATENT DOCUMENTS

| 4,586,094 | A | * | 4/1986 | Chambors et al. ....... 360/77.12 |
| 5,689,384 | A | | 11/1997 | Albrecht et al. |
| 5,923,272 | A | | 7/1999 | Albrecht et al. |
| 6,411,460 | B1 | * | 6/2002 | Fasen ........................... 360/75 |
| 6,873,487 | B1 | * | 3/2005 | Molstad ....................... 360/75 |

* cited by examiner

*Primary Examiner*—Wayne Young
*Assistant Examiner*—Jason Olson
(74) *Attorney, Agent, or Firm*—Sughrue Mion, PLLC

(57) ABSTRACT

Disclosed is a magnetic tape which contributes to a high recording density, and which achieves an enhanced flexibility in a width of a data track and a data format. The magnetic tape includes servo tracks being recorded thereon. These servo tracks contain respective servo signals, and are arranged lengthwise and adjacent to one another over a whole of a width or a part of the magnetic tape. Further, each of the servo tracks includes address signals being recorded thereon at predetermined intervals in isolation from the corresponding servo signals. These address signals indicate their respective locations of corresponding one of the servo tracks and their respective lengthwise locations on the magnetic tape. In addition, the servo signals are read from the respective servo bands, and are used to adjust tracking of a magnetic head on the magnetic tape.

26 Claims, 8 Drawing Sheets

MAGNETIC TAPE, MAGNETIC TAPE CARTRIDGE, MAGNETIC TAPE DRIVE, AND METHOD FOR RECORDING DATA ON MAGNETIC TAPE

BACKGROUND OF THE INVENTION

1. Field of the Invention

Apparatuses and a method consistent with the present invention relate to a magnetic tape, a magnetic tape cartridge, a magnetic tape drive, and a method for recording data on a magnetic tape.

2. Description of the Related Art

As the high recording density of magnetic tapes advances, a demand for an accurate tracking technique becomes stronger. To meet this demand, at present, servo-tracking signals (servo signals) are recorded on a magnetic tape beforehand, and data is recorded/reproduced on/from the magnetic tape, while the servo signals are read and the tracking on the tape is then adjusted based on the servo signals read.

However, as the recording density is further increased, the time that is required to pinpoint the location of data from a magnetic tape ends up being longer when the data is searched through the tape or when new data is appended thereon. This lowers the level of operating convenience. To prevent this degradation, information regarding the location of data is encoded into servo signals of a magnetic tape, so that data detection is made faster and more efficient. The above servo signals, however, occupy a large area of a magnetic tape, because servo signals and data are typically positioned on the tape, while being separated from each other. This may inhibit the high recording density, thereby causing a problem.

On the other hand, within the content of the current technique, a width (pitch) of a data track and a location of the track on a magnetic tape depend on a magnetic tape drive, thereby making it difficult to produce different widths and locations on a single magnetic tape. To give an example, if a magnetic tape is recorded by a drive in such a way that the width of the data track is formed to be Tw ($\mu$m), then this tape cannot be recorded to form a Tw/2 ($\mu$m) width. Similarly, a magnetic tape, on which an old model of a magnetic tape drive has recorded data, may not always be recorded by a current model even if it can be reproduced. In other words, compatibility among models, systems, etc. of drives is lacking, thereby causing an additional problem.

Conventionally, methods for sequentially recording data on a magnetic tape have been applied, because it is difficult to record data at desired locations on the track, that is, randomly record data on the tape. Such a sequential data format seems inefficient in view of data accessibility. As methods for improving data accessibility, servo tracking techniques are disclosed in U.S. Pat. Nos. 6,172,837 and 6,411,460. In these methods, servo bands are formed over a full width of a magnetic tape in advance, and by use of a magnetic tape drive, parts of the servo bands are erased and data is recorded on the erased parts.

However, even with these methods, the structure of the erased servo bands and the data format are still determined by a magnetic tape drive. Once a magnetic tape is recorded by a certain drive model, it may not be recorded by another model. In other words, neither different structures of the servo bands nor different data formats are allowed on a single magnetic tape.

SUMMARY OF THE INVENTION

The present invention has been conceived, taking the above disadvantages into account. The present invention is aimed at providing a magnetic tape, a magnetic tape cartridge, a magnetic tape drive, and a method for recording data on a magnetic tape, which all contribute to a high recording density, and which all achieve an enhanced flexibility in the width of the data track and a data format.

In the present invention, cells are formed on a magnetic tape as an information-recorded unit. Each cell contains an address, and can be arbitrarily erased and overwritten.

According to an aspect of the present invention, there is provided, a magnetic tape including a plurality of servo tracks being recorded on the magnetic tape. The servo tracks include respective servo signals, and are arranged lengthwise and adjacent to one another over a whole of a width or a part of the magnetic tape.

Further, each of the servo tracks includes a plurality of address signals being recorded thereon at predetermined intervals in isolation from the corresponding servo signals, the address signals indicating their respective locations of corresponding one of the servo tracks and their respective lengthwise locations on the magnetic tape, In addition, the servo signals are read from the respective servo tracks, and are used to adjust tracking of a magnetic head on the magnetic tape.

With this magnetic tape, data bands of different widths can be recorded thereon. Therefore, the problem of the lacking compatibility is overcome.

The servo signal included in the servo track is composed of patterns, each of which is made up of a pair of lines being non-parallel with each other, and which are repeatedly arranged lengthwise. Further the servo signal has an output of which pulse duration or level gradually differs depending on a breadthwise position of corresponding one of the servo tracks.

According to another aspect of the present invention, there is provided, a magnetic tape cartridge including a cartridge case, a reel being provided in the cartridge case, and the above magnetic tape being wound around the reel.

Further, this magnetic tape has a part on which reference information is recorded, the reference information including an index of data recorded on the magnetic tape and an address of the data.

The reference information is recorded on a region ranging from a start point of the magnetic tape to a predetermined location thereof.

The magnetic tape cartridge further includes a contact or non-contact memory on which reference information is recorded, the reference information including an index of data recorded in the magnetic tape and an address of the data.

With the magnetic tape cartridge, handling of the magnetic tape can be made easier.

Thanks to the reference information, the locations where data to be reproduced/recorded is placed are detected for a short time by referring to the index and address included in the reference information. Further, since this reference information is located at the start point of the magnetic tape, it can be read right after the magnetic tape cartridge is set in a drive. Accordingly, the problem of the inefficient data accessibility is overcome.

According to yet another aspect of the present invention, there is provided, a magnetic tape drive for recording data on the above magnetic tape cartridge, including:

(a) a magnetic tape running system for running the magnetic tape;
(b) a magnetic head including at least a servo signal read device, a data recording device and a data reproducing device, the servo signal read device for reading the servo signals and the address signals from the magnetic tape, the data recording device for recording data on the magnetic tape, the data reproducing device for reading the data and the reference information from the magnetic tape;
(c) a servo controller for adjusting tracking of the magnetic head on the magnetic tape, based on the servo signals being read by the servo signal read device;
(d) a control unit for controlling the magnetic tape running system and the magnetic head; and
(e) the control unit for determining a next recording address, based on the reference information being read by the data reproducing device, for driving the magnetic tape running system and moving the magnetic head, based on the address signals being read by the servo signal read device, so that the data recording device is positioned at the determined recording address, and for applying a recording signal to the magnetic head, based on the data to be recorded.

Further, if the reference information is recorded on a memory, then the magnetic tape drive may be provided with a memory reader that reads the reference information from the memory, and the above control unit may determine the next address, based on the reference information being read by the memory reader.

The data recording device in the magnetic tape drive records the data by overwriting it on the servo signals and the address signals being included in the servo tracks. This overwriting process prevents the servo signals from occupying a large area of the magnetic tape. As a result, the problem of the inhibition of the high recording density can be eliminated.

According to still another aspect of the present invention, there is provided, a method for recording data on a magnetic tape in the above magnetic tape cartridge by use of a magnetic head, the magnetic head including a servo signal read device, a data recording device and a data reproducing device, the method including the steps of:

(a) reading the reference information by use of the data reproducing device to determine a next recording address;
(b) running the magnetic tape and moving the magnetic head, based on the address signals being read by the servo signal read device, so that the data recording device is positioned at the determined recording address, and
(c) applying a recording signal to the data recording device, based on data to be recorded, thereby recording data on the magnetic tape.

Further, in the step (c), the data is recorded by being overwritten on the servo signals and the address signals being both included in the servo tracks.

In conclusion, with the magnetic tape, the magnetic tape cartridge, the magnetic tape drive, and the method for recording data on the magnetic tape according to the present invention, it is possible to attain the goal of providing a magnetic tape, a magnetic tape cartridge, a magnetic tape drive, and a method for recording data on the magnetic tape, which all contribute to the high recording density, and which all achieve the enhanced flexibility in the width of the track of data and a data format.

BRIEF DESCRIPTION OF THE DRAWINGS

For a more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

Figure 1:
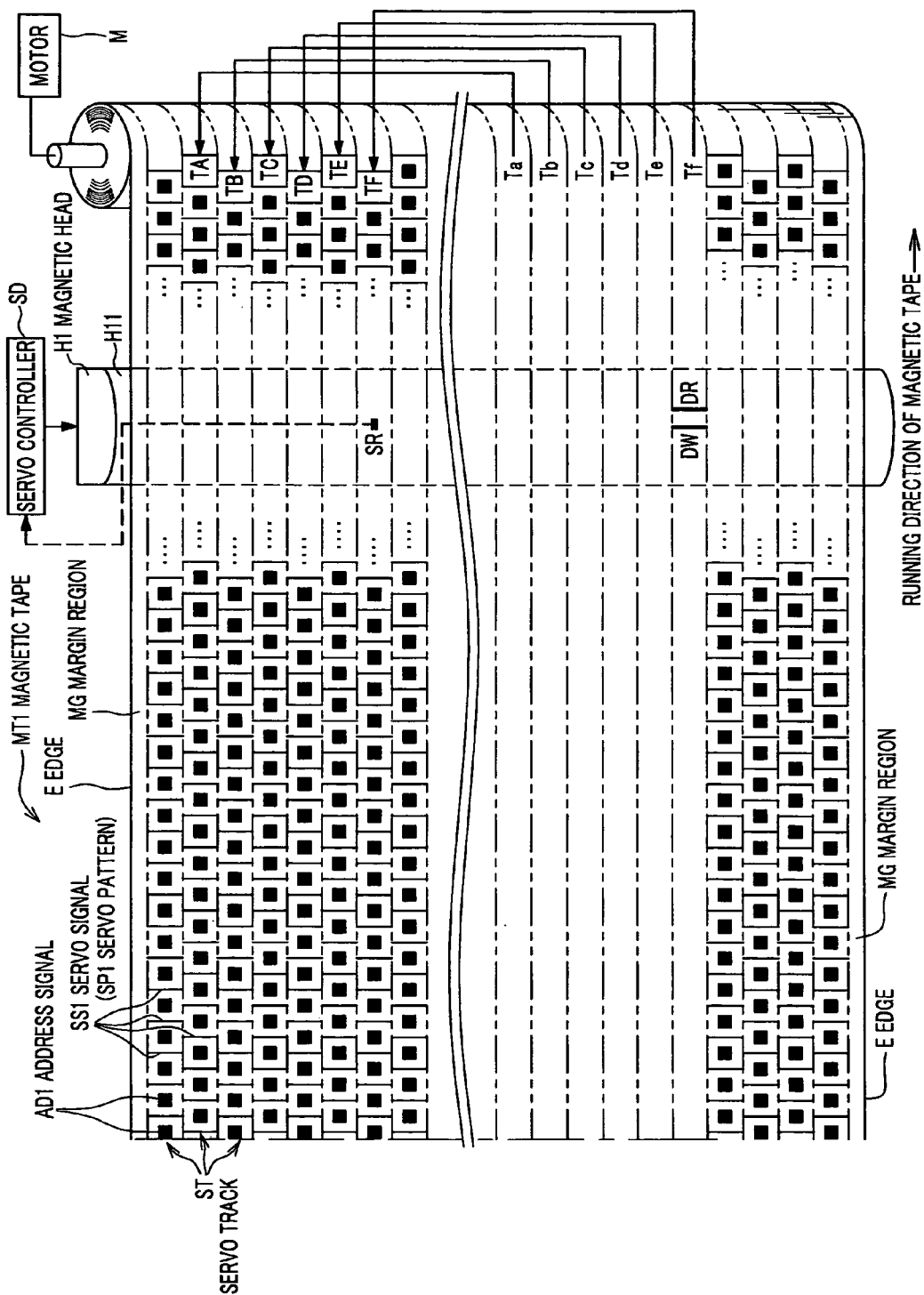
FIG. 1 is a schematic view depicting a magnetic tape according to an embodiment of the present invention.

An embodiment of the present invention will be described below in detail with reference to accompanying figures as appropriate. FIG. 1 schematically shows a magnetic tape according to an embodiment of the present invention; and FIG. 2 shows servo signals recorded on the magnetic tape.

As shown in FIG. 1, servo signals SS1 are recorded beforehand on a full width of a magnetic tape MT1 according to the embodiment with a servo writer that will be described in detail later (see FIG. 3). Each servo signal SS1 is composed of magnetized regions having a predetermined pattern, which are repeatedly recorded lengthwise on the magnetic tape MT1. Further, the servo signal forms a servo track ST spanning lengthwise. On the both longitudinal sides of the magnetic tape MT1, that is, on both the sides of a group of the servo tracks formed on the full width of the magnetic tape MT1, blank margin regions MG are formed. Each margin region MG is formed to prevent the servo signals SS1 near the long side from protruding beyond the edge of the magnetic tape MT1 when these servo signals SS1 are recorded on the tape MT1. The magnetic tape MT1 runs in the direction from left to right in FIG. 1 while being rewound by a motor M. Further, the magnetic tape MT1 is brought into contact with a magnetic head H1, and data is thereby recorded/reproduced on/from the tape MT1.

The magnetic head H1 has a surface H11 to be in contact with a magnetic tape, and on the surface H1, a servo signal read device SR, data recording devices DW and data reproducing devices DR that are all arranged in predetermined intervals. The tracking of the magnetic head H1 on the magnetic tape MT1 is adjusted by a servo controller in accordance with the servo signal SS1 read by the servo signal read device SR.

Figure 2C:
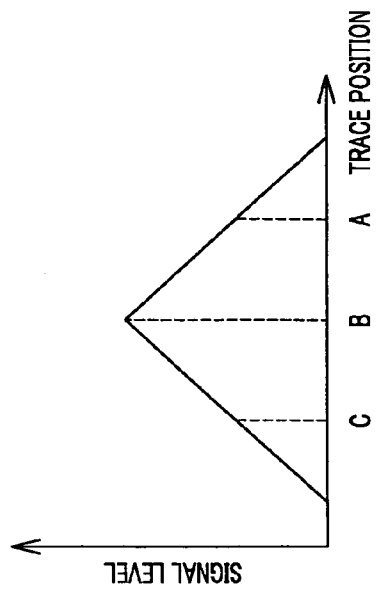
FIG. 2C is a graph showing a relation between positions where the servo signal read devices trace and levels of the electric signals.
Figure 2D:
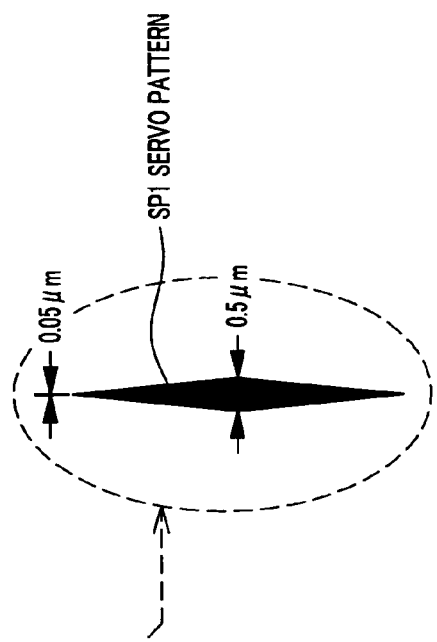
FIG. 2D is an enlarged view of a servo pattern.
Figure 2A:
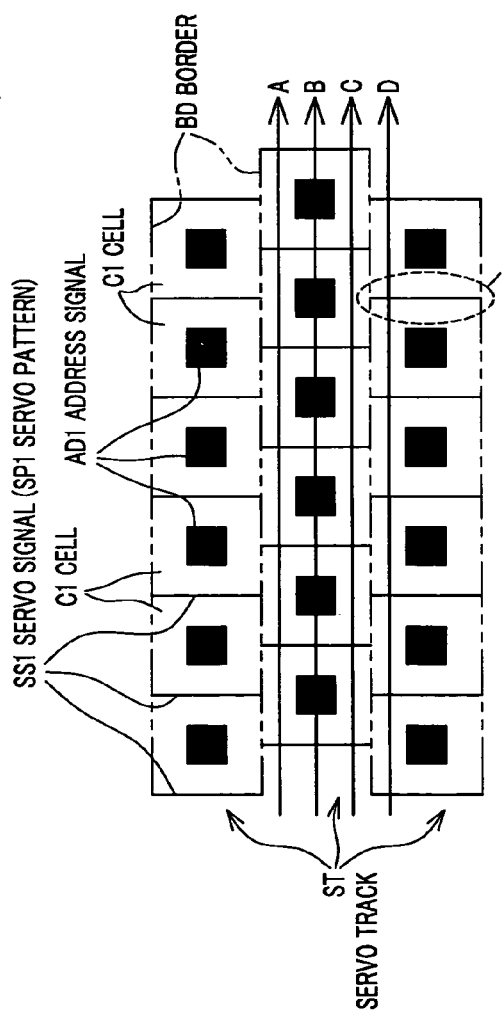
FIG. 2A is an enlarged view of servo tracks recorded on the magnetic tape.

As shown in FIG. 2A, each servo track ST is composed of the servo signal SS1 recorded on the magnetic tape MT1 lengthwise. In addition, the servo signal SS1 is constituted of magnetized regions, each of which has a substantial diamond shape so as to be wide at the middle and to be narrow at both tips, as the servo pattern SP1 in FIG. 2D. For example, the middle of the servo pattern SP1 is 0.5 µm width, and each tip is 0.05 µm width.

The servo patterns SP1 are repeatedly recorded at substantially the same intervals as the width of the servo track ST, thus constituting virtual cells C1, each of which is surrounded by the servo patterns SP1 and borders BD each being placed between the adjacent servo tracks. Each cell C1 serves as a minimum region where data is recorded.

At the center of the cell C1, an address signal AD1 is recorded. The address signal AD1 contains information designating the locations of the cell C1 and of the track on the magnetic tape MT1. This information is encoded into the address signal AD1 as binary information. It is preferable that the address signals AD1 are not identical to one another in a single magnetic tape. Further, the address signals AD1 are arranged so as to be incremented or decremented lengthwise or breadthwise. It is because, even when some of the address signals AD1 are lacked, the locations of these lacked signals can be pinpointed based on this regularity. In FIG. 2A, each cell C1 of the servo track ST is shifted from the corresponding cell C1 of the next servo track ST by a half of the length of the cell, but they may be aligned with each.

Figure 3:
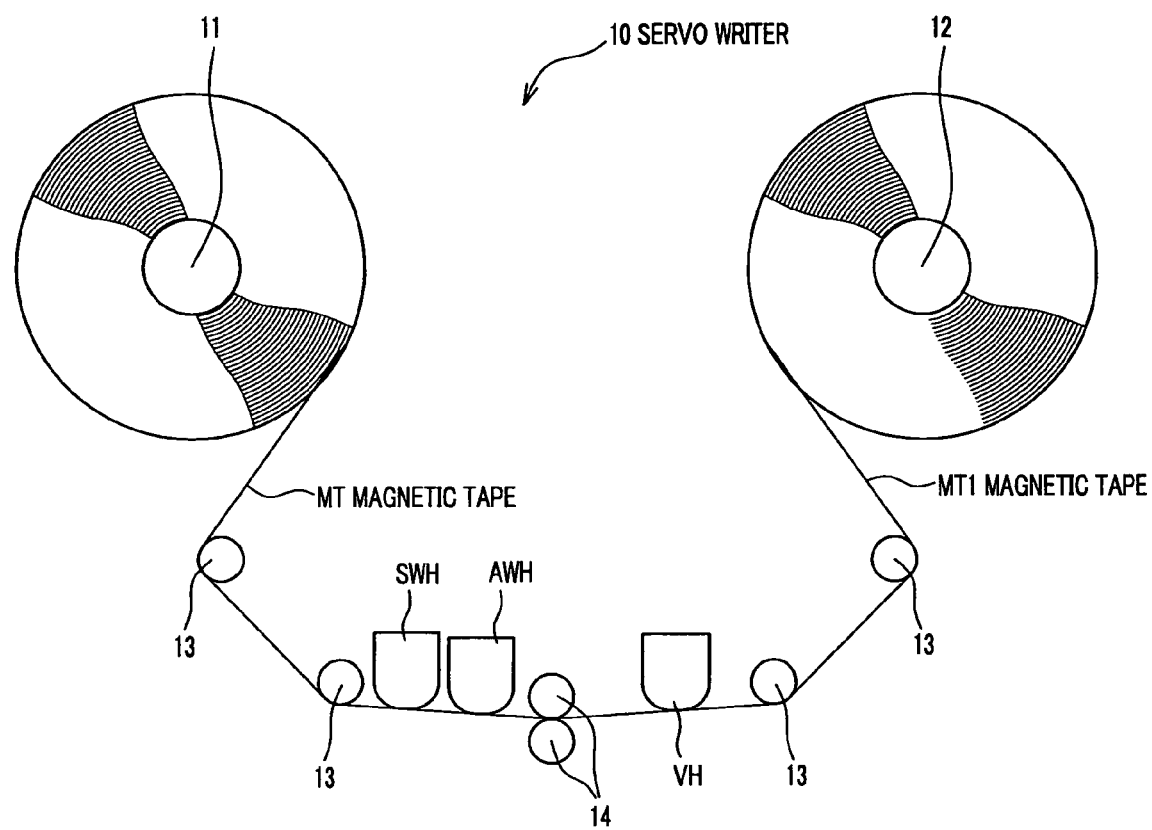
FIG. 3 is a schematic view of a servo writer according to the embodiment.

The servo signals SS1 and the address signals AD1 can be written on the magnetic tape MT1 by a servo writer 10 shown in FIG. 3. The servo writer 10 includes a supply reel 11 that feeds the magnetic tape MT, a take-up reel 12 that winds the magnetic tape MT1 on which the servo signals SS1 have been written, and a motor (not shown) that drives them. Further, the servo writer 10 includes multiple guide rollers 13 that guide the magnetic tape MT fed from the supply reel 11, pinch rollers 14 that run the magnetic tape MT and MT1 with a constant speed, a servo write head SWH that writes the servo signals SS1, an address write head AWH that writes address signals AD1, and a verifying head VH that verifies the written servo signals SS1 and address signals AD1.

The servo write head SWH has, on its surface being in contact with the magnetic tape MT, multiple magnetic gaps having the same shape as that of the servo pattern SP1. The servo write head SWH receives a pulse signal of a predetermined period and, thereby magnetizes a record layer of the magnetic tape MT, so that the servo signal SS1 is formed on the magnetic tape MT.

Similarly, the address write head AWH has, on its surface H11 being in contact with the magnetic tape MT, magnetic gaps for recording the address signals. Each gap is positioned at the middle of the width of the corresponding servo track ST. In each magnetic gap, a magnetic circuit is provided, and this circuit receives the address signals AD1, and the address write head AWH thereby magnetizes the record layer on the magnetic tape MT, so that the address signals AD1 are formed on the magnetic tape MT. The servo patterns SP1 may be formed not only by a magnetic head as in the servo writer 10, but also by transferring magnetism of a master tape as disclosed in Japanese Unexamined Patent Application No. 5-298657. This magnetic transfer technique includes a thermo-magnetic transfer technique using a $CrO_2$ tape, and a magnetic field transfer technique using a Co-containing iron oxide tape.

Figure 2B:
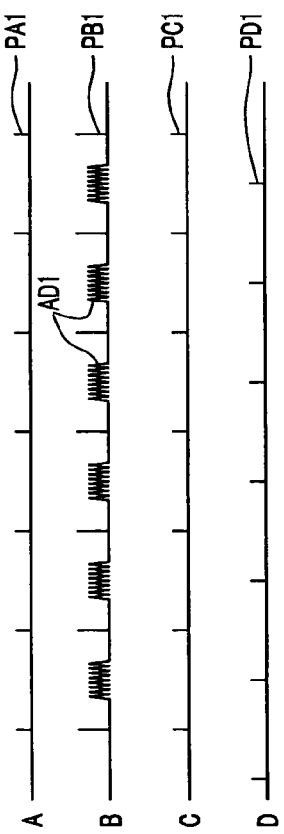
FIG. 2B is a view depicting electric signals generated when servo signal read devices trace lines A, B, C and D shown in FIG. 2A, and read signals, respectively.

When the servo signal read device SR reads the servo signals SS1 from the above magnetic tape MT1, electric signals as shown in FIG. 2B are detected. FIG. 2B shows electric signals generated when the servo signal read device SR traces lines A, B, C and D shown in FIG. 2A and then reads the respective servo signals SS1 thereon.

In tracing the A or C line, the servo signal read device SR traverses the relatively narrow parts of the servo patterns SP1, and the detected electric pulse signal PA1 or PC1 hence has a low level. In contrast, in tracing the center of the servo track ST, that is, the B line, the servo signal read device SR traverses the widest parts of the servo patterns SP1, and the detected electric pulse signal PB1 hence has a high level. In this case, the address signals AD1 can also be read. When the servo signal read device SR traces the line D on the next servo track ST, it traverses the tip of the servo patterns SP1. The detected electric signal PD1 accordingly has a low level, and its phase is shifted from that of the next servo track ST by an amount in accordance with a shift amount between the cells. Note that the difference among the electric servo signals PA1 to PD1 (pulse signals) account for the level rather than the pulse duration. This is because the detected frequency is recognized to be lower than a frequency depending on the shape of the servo pattern SP1 and the running speed of the magnetic tape MT1.

As described above, the electric pulse signal, which is generated when the servo signal SS1 is read by the servo signal read device SR, has a level different depending on the width position where the servo patterns SP1 are traced. In addition, the signal of the highest level is generated when the servo signal read device SR traverses the widest parts of the servo patterns SP1 (see FIG. 2C). Accordingly, if the breadthwise position of the magnetic head H1 is adjusted such that the detected electric servo signal (pulse signal) has the highest level, then the servo signal read device SR traverses the center of the servo track ST. In this case, if the data recording devices DW have a desired positional relationship with the servo signal read device SR, then the data recording devices DW can record data on a correct position of the track thanks to the servo signal SS1.

Figure 4A:
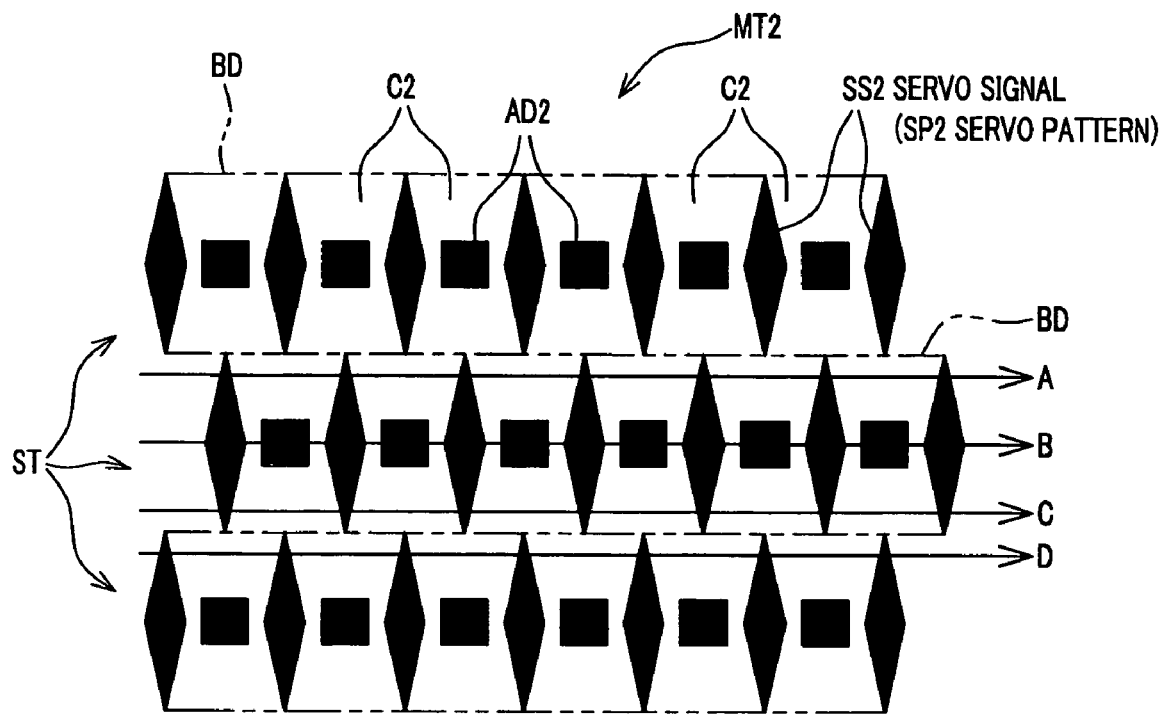
FIG. 4A is an enlarged view depicting another variation of the servo pattern.
Figure 4B:
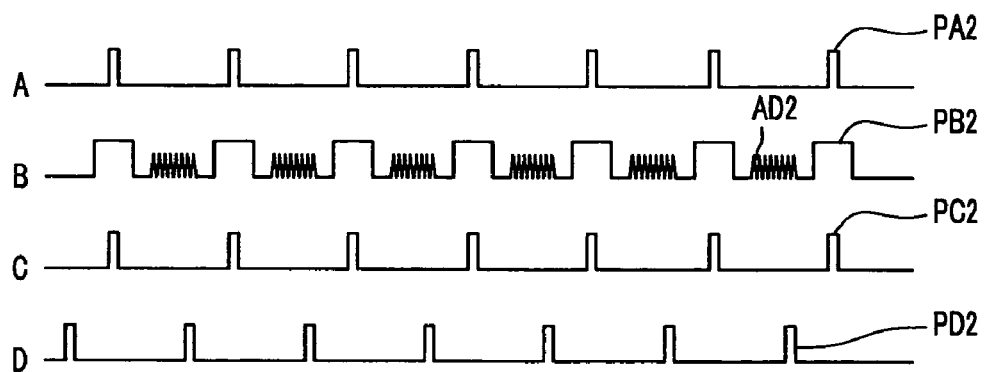
FIG. 4B is a view depicting electric signals generated when servo signal read devices trace lines A, B, C and D shown in FIG. 4A, and read signals on the lines, respectively.

Some variations of the above servo patterns can be considered. FIGS. 4A and 4B show one of the variations of the servo patterns. Specifically, FIG. 4A shows servo patterns on a magnetic tape; and FIG. 4B shows electric servo signals generated when the servo signals on the magnetic tape of FIG. 4A is read by the servo signal read device.

As shown in FIG. 4A, a servo signal SS2 is composed of servo patterns SP2 repeatedly written on a magnetic tape MT2 at predetermined intervals along the long side. Each cell C2 is formed by being surrounded by borders each placed between the servo tracks ST and the two servo patterns SP2, and at its center, an address signal AD2 is recorded. This cell C2 serves as a minimum region where data is recorded.

Each servo pattern SP2 is formed to have a substantial diamond shape so as to be wide at the middle and to be narrow at both tips. The shape of the servo pattern SP2 is similar to that of the servo pattern SP1, but the servo pattern SP2 is much wider than the servo pattern SP1. For example, the servo pattern SP2 has a center of 3 μm and each tip of 0.5 μm width.

Due to this shape, when the servo signal read device SR traces lines A, B, C and D shown in FIG. 4A, and then reads the servo signals SS2 thereon, electric pulse signals as shown in FIG. 4B are detected. In tracing the line A, C or D, the servo signal read device SR traverses the tip of the servo patterns SP2, and the detected electric pulse signals PA2, PC2 and PD2 hence have a short pulse duration. In contrast, in tracing the line B, since the servo signal read device SR traverses the center of the servo patterns SP2, the detected electric pulse signal PB2 has a long pulse duration. In this case, the address signals AD2 are also detected.

The electric pulse signals are generated when the servo signals SS2 are read, and have a pulse duration different depending on the breadthwise positions of the servo tracks ST. When the above servo signal SS2 is used, if the position of the magnetic head H1 is adjusted so that the electric pulse signal has the longest pulse duration, then the servo signal read device SR can precisely trace the center of the servo tracks ST.

Figure 5A:
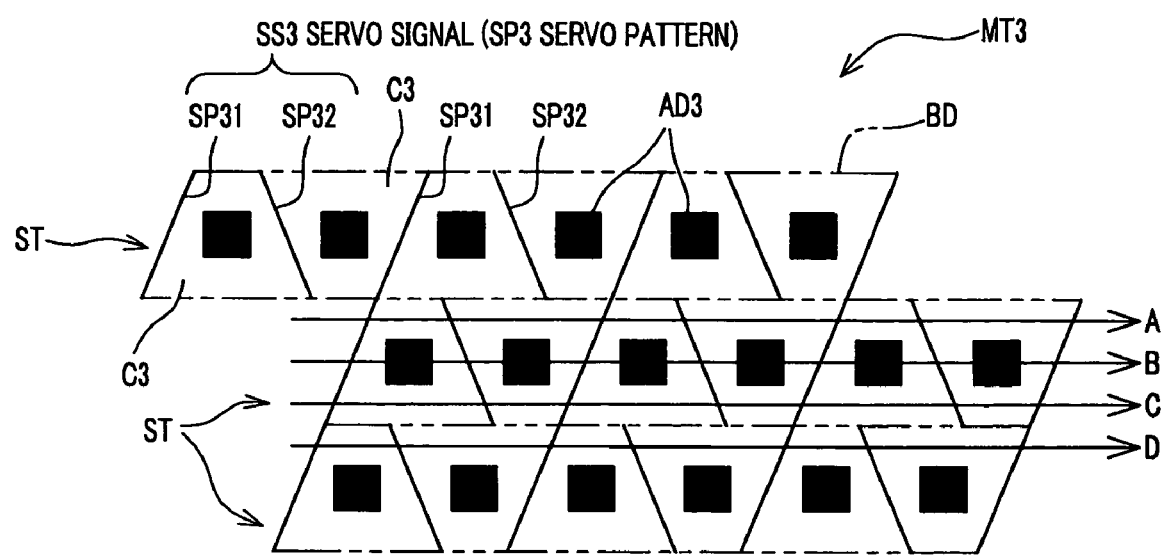
FIG. 5A is an enlarged view depicting another variation of the servo pattern.
Figure 5B:
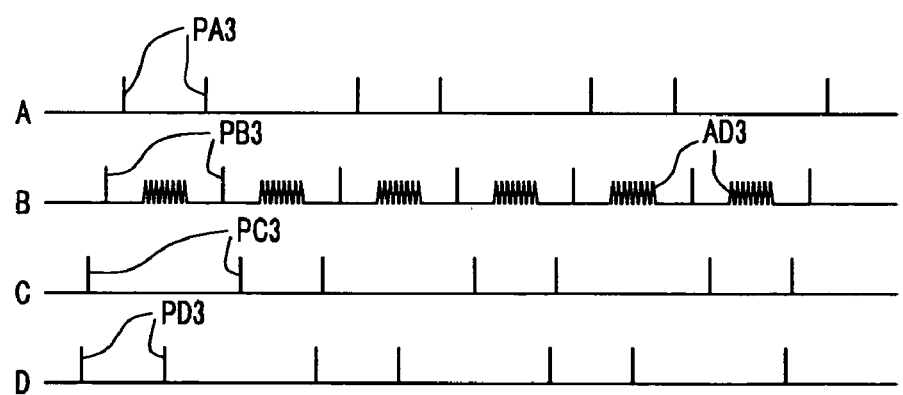
FIG. 5B is a view depicting electric signals generated when servo signal read devices trace lines A, B, C and D shown in FIG. 5A, and read signals on the lines, respectively.

FIGS. 5A and 5B show another variation of the servo patterns. Specifically, FIG. 5A shows servo patterns on the magnetic tape; and FIG. 5B shows electric signals generated when the servo signal read device reads the servo signals from the magnetic tape.

As shown in FIG. 5A, servo signals SS3 is made up of servo patterns SP3 recorded on a magnetic tape MT3, and each servo pattern SP3 is composed of linear patterns SP31 and SP32. These patterns are recorded thereon at predetermined intervals. The pattern SP31 is inclined with respect to the width of the magnetic tape MT3, while the pattern SP32 is aligned with an angle opposite to the pattern SP31 with respect thereto. Each cell C3 is formed by being surrounded by the patterns SP31 and SP32, borders BD each placed between the servo tracks ST, and at its center, an address signal AD3 is recorded. In this case, the cell C3 serves as a minimum region where data is recorded.

When the servo signal read device SR traces lines A, B, C or D as shown in FIG. 5A and then reads the servo signals SS3, electric pulse signals as shown in FIG. 5B are detected. In tracing the line A or D, the servo signal read device SR traverses upper parts, that is, the narrow parts of the servo patterns SP3, and the detected electric pulse signals PA3 or PD3 hence has a short period. Meanwhile, in tracing the line C, the servo signal read device SR traverses the lower parts, that is, the wide parts of the servo patterns SP3, and the detected electric pulse signal PC3 hence has a long period. Furthermore, in tracing the line B, the detected electric pulse signal PB3 has a mid-period between those of the signals A and C, and at the same time, address signals AD3 are also detected.

With the servo signal SS3 which is composed of a pair of linear patterns non-parallel to each other, if the breadthwise position of the magnetic head H1 is adjusted so that the electric pulse signal detected from the servo signal SS3 has a predetermined period (for example, the period of the signal B in FIG. 5B), then the servo signal read device SR can precisely trace the center of the servo track ST.

Figure 6:
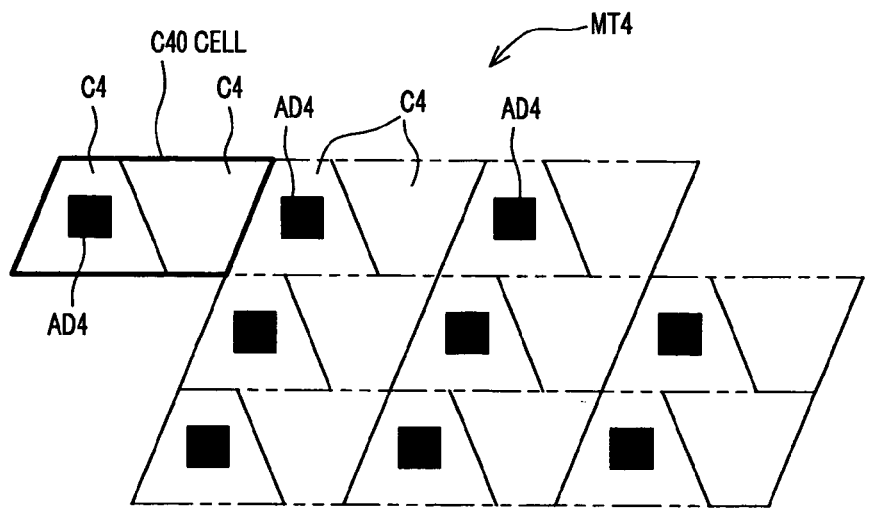
FIG. 6 is a view depicting a variation of the servo pattern of FIG. 5.

FIG. 6 shows another variation of the servo patterns. The servo patterns shown in FIG. 6 differ from those shown in FIG. 5 in that address signals AD4 are not provided within the cells C4 one by one, but the address signals AD4 are alternately provided within the address signal AD4 along the long side. In this case, a pair of cells C40 which are surrounded by a heavy line in FIG. 6 serves as a minimum region where data is recorded.

Figure 7:
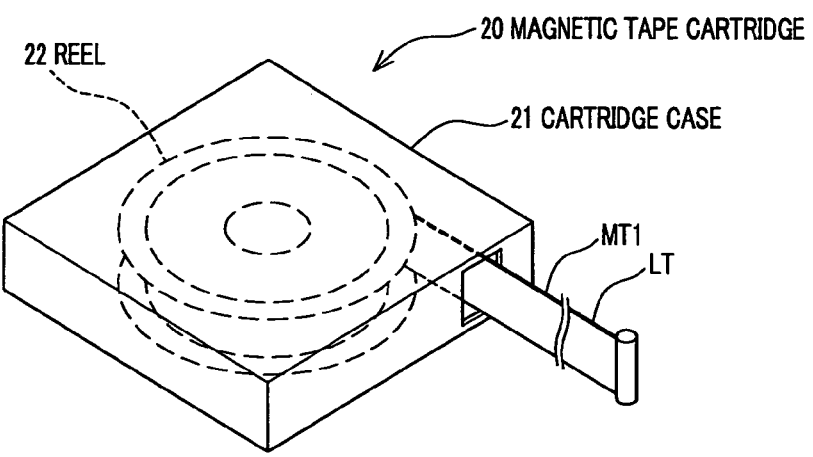
FIG. 7 is a perspective view depicting a magnetic tape cartridge according to the embodiment.

As shown in FIG. 7, the magnetic tape MT1 is wound around the reel 22, and is then accommodated into the cartridge case 21, thus constituting a magnetic tape cartridge 20. This cartridge structure makes handling of the magnetic tape MT1 easier. The wound magnetic tape MT1 contains, at any given location, reference information regarding an index of data recorded on the tape MT1 itself and addresses of the data. It is preferable that this reference information is recorded from the start point of the magnetic tape MT1 to a predetermined location thereof. The reference information can thereby be read as soon as the magnetic tape cartridge 20 is set, thus increasing the access speed of the data. If the magnetic tape MT1 has, at its start point, a reader tape LT used for feeding the magnetic tape MT1 itself, then the reference information may be recorded on the magnetic tape MT1 after the reader tape LT is fed. Alternatively, if the reader tape LT has a record layer, then the reference information may be recorded on the reader tape LT itself.

Figure 8:
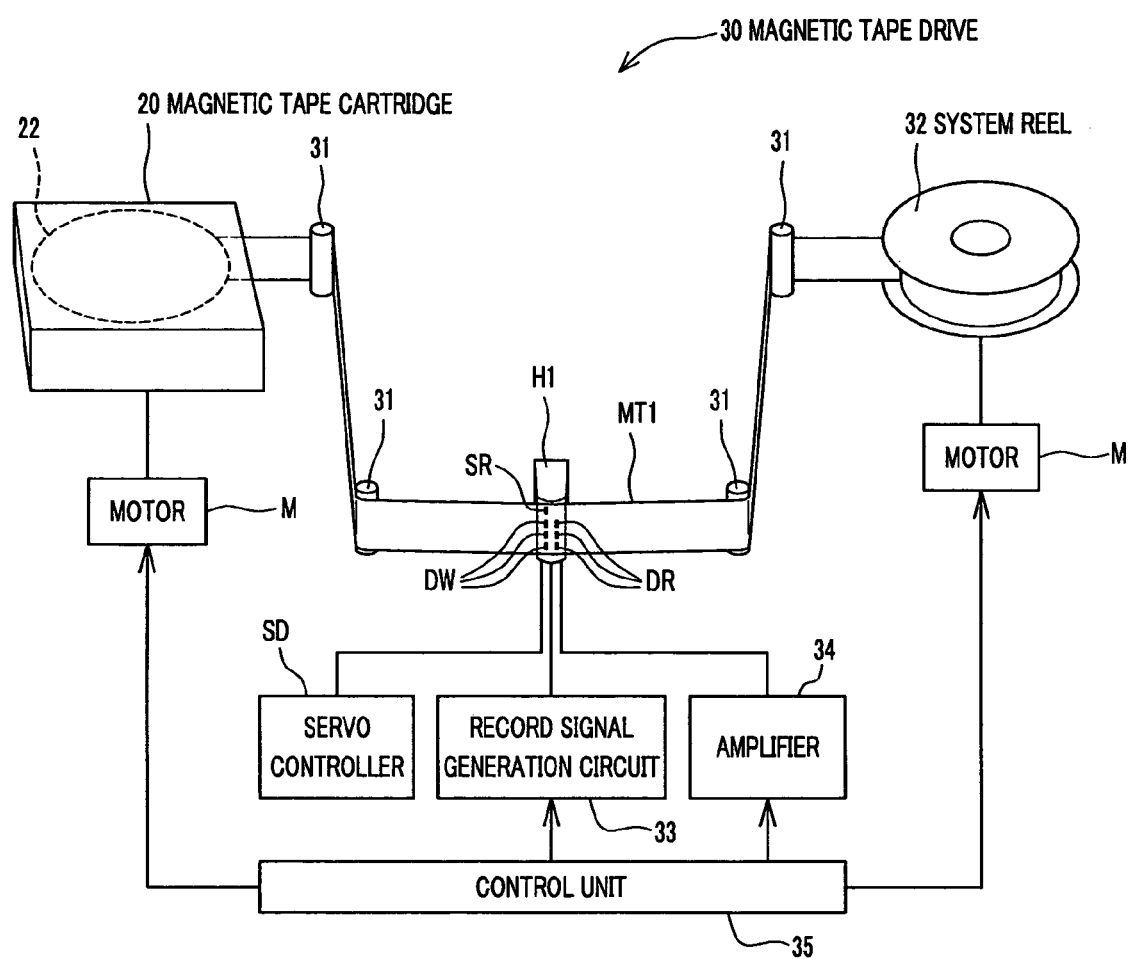
FIG. 8 is a schematic view depicting a magnetic tape drive according to the embodiment.

Next, a description will be given of a magnetic tape drive which records/reproduces data on/from the magnetic tape MT1 in the magnetic tape cartridge 20. FIG. 8 schematically shows a magnetic tape drive. A magnetic tape drive 30 includes, as a magnetic tape running system, two motors M, a system reel 32 and multiple guide rollers 31. One of the motors M rotatably drives the reel 22 of the magnetic tape cartridge 20, and the other rotatably drives the system reel 32. The system reel 32 winds the magnetic tape MT1 drew from the magnetic tape cartridge 20. The guide rollers 31 guide the magnetic tape MT1. Further, the magnetic tape drive includes the magnetic head H1, which incorporates the servo signal read device SR, the data recording devices DW and the data reproducing devices DR. The data recording devices DW are arranged at predetermined intervals along the short sides of the magnetic tape MT1, and the data reproducing devices DR are also arranged therealong at predetermined intervals.

As described above, the tracking of the magnetic head H1 is adjusted based on the electrical servo signal generated when the servo signal SS1 is read by the servo signal read device SR. The magnetic tape drive 30 further includes a record signal generation circuit 33, an amplifier 34 and a control unit 35. The record signal generation circuit 33 applies a record signal to each data recording device DW. The amplifier 34 amplifies a signal read by each data reproducing device DR. The control unit 35 controls, through the record signal generation circuit 33 or the amplifier 34, the recording/reproducing operations and the tracking of the magnetic head H1 and, further controls the magnetic tape running system.

The control unit 35 allows the data reproducing devices DR to read the reference information from the part of the magnetic tape MT1 in the magnetic tape cartridge 20 and, then determines next recording addresses. Subsequently, the control unit 35 drives the magnetic tape running system and moves the magnetic head H1 so that the data recording devices DW are positioned at the next recording addresses on the magnetic tape MT1. Further, the control unit 35 allows the record signal generation circuit 33 to apply a recording signal to the data recording devices DW so that data is record on the magnetic tape MT1, or acquires the reproduction signals from the data reproducing devices DR through the amplifier 34.

Next, a description will be given of a method for handling the magnetic tape cartridge 20 (magnetic tape MT1) by use of the above magnetic tape drive 30. In order to form data tracks of the same width on the magnetic tape MT1 and then record data thereon by use of the magnetic tape drive 30, the magnetic head H1 which has the data recording devices DW provided with the same recording width as shown in FIG. 1 is used. Specifically, when data is recorded on the tracks Ta, Tb, Tc, Td, Te and Tf, the servo signal is read from the tracks TA, TB, TC, TD, TE and TF, respectively, by the servo signal read device SR. Subsequently, the servo controller SD controls the breadthwise position of the servo signal read device SR so that the servo signal read device SR traverses the center of the servo track ST, and at the same time, data is recorded on corresponding one of the tracks Ta, Tb, Tc, Td, Te and Tf by the data recording device DW. In this case, the data is overwritten on the corresponding one of the servo tracks Ta, Tb, Tc, Td, Te and Tf that have contained the servo signal SS1 and the address signal AD1.

When data is reproduced from the servo tracks Ta, Tb, Tc, Td, Te and Tf, the servo signal SS1 is read from the tracks TA, TB, TC, TD, TE and TF, respectively, by the servo signal read device SR as with the case of recording of data. At the same time, the data is read by the data reproducing device DR while the tracking of the magnetic head H1 on the magnetic tape MT1 is adjusted based on the servo signal SS1 read. Note that the above method for recording data is also applied to the case where data is recorded on the region covering the multiple servo tracks ST. Concretely, this method makes it possible to record data tracks of multiple widths on the magnetic tape MT1

Figure 9:
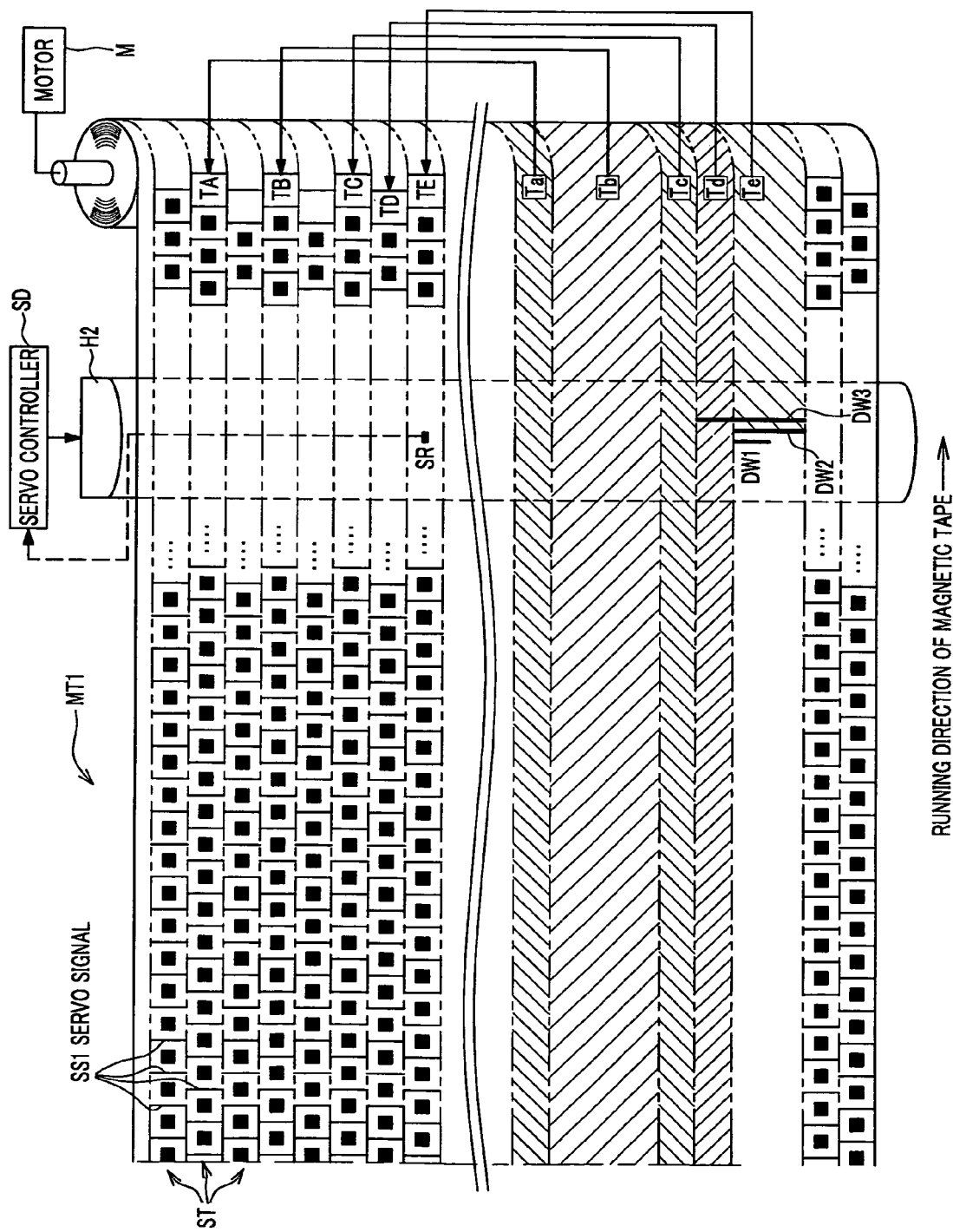
FIG. 9 is a schematic view depicting the magnetic tape in use.

When such data tracks of multiple widths are recorded on the magnetic tape MT1, the magnetic head H2 as shown in FIG. 9 may be used. This magnetic head H2 has data recording devices DW1, DW2 and DW3 of which recording widths differs from one another. The recording width of the data recording device DW1 corresponds to that of the servo track ST, the recording width of the data recording device DW2 corresponds to double the width of servo track ST, and the recording width of the data recording device DW3 corresponds to triple the width of the servo track ST.

When the above magnetic tape drive is used, if the data track Ta of which width corresponds to that of the servo track ST is recorded on the magnetic tape MT1, then the recording process is done by the data recording device DW1, while the servo signal SS1 is read from the track TA by the servo signal read device SR and the tracking is then adjusted based on the servo signals SS1 read. If the data track Tb of which width corresponds to triple the width of the servo track is recorded on the magnetic tape MT1, then the recording process is done by the data recording device DW3, while the servo signal SS1 is read from the track TB by the servo signal read device SR and the tracking is then adjusted based on the servo signals SS1 read.

Similarly, if the data tracks Tc or Td of which width corresponds to that of the servo track ST is recorded, then the recording process is done by the servo signal read device SR, while the servo signal SS1 is read from the track TC or TD by the servo signal read devices SR and the tracking is then adjusted based on the servo signal SS1 read.

If the data track Te of which width corresponds to double the width of the servo track ST is recorded, then the recording process is done by the data recording device DW2, while the servo signal SS1 is read from the track TE by the servo signal read device SR and the tracking is then adjusted based on the servo signals SS1 read.

As described above, it is possible to record data tracks of different widths on the magnetic tape MT1. Conventionally, the servo tracks are formed merely on both the long sides of each of the data bands on the magnetic tape. In contrast, in this embodiment, the servo tracks ST are formed adjacent to one another, and the servo signal SS1 can therefore be read by the servo signal read device SR, even if the servo track ST is overwritten by any of the data recording devices DW1, DW2 and DW3. In addition, each cell C1 of the servo track ST contains the lengthwise or breadthwise positions on the magnetic tape. Accordingly, even when the data recording device DW1, DW2 or DW3 records data on any given location of the magnetic tape, the servo signal read device SR receives the address signal AD1, thereby ensuring that the location where data is record is pinpointed.

If the information regarding a lengthwise location on the magnetic tape is contained in the servo signal SS1 as in a conventional technique such as LTO technology, then several hundreds of the servo patterns must be read in order to pinpoint the location. In contrast, in this embodiment, since each cell C1 or multiple cells C1 as in the variation in FIG. 6 contain the address signal AD1, the location can be read for a short time, thereby increasing the access speed of data. As described above, in this embodiment, it is possible to record the data tracks of different widths on desired locations of the magnetic tape. Moreover, since each minimum region on which data is recorded contains the address signal, a data access equivalent to the random access can be realized.

Up to this point, the embodiment of the present invention has been described, but the present invention is not limited to this embodiment, and variations can be made as appropriate.

For example, in this embodiment, the servo tracks ST containing the servo signals SS1 are recorded over the full width of the magnetic tape MT1. However, the servo tracks ST may be recorded on the part of the magnetic tape MT1. It is because that, owing to the positions of the three devices SR, DW and DR and the number of each of the two devices DW and DR, the area where the servo signals SS1 can be accessed is limited. To give an example, the servo tracks ST may be formed only on a quarter of the full width of the magnetic tape MT1.

In this case, the data band is not overwritten on the servo tracks ST, but may be recorded only on the area where the servo tracks are not formed.

In this embodiment, the reference information is recorded on a part of the magnetic tape MT1, but the magnetic tape cartridge 20 is provided with a contact or non-contact memory (also called "cartridge memory") composed of semiconductor memory cells, and the reference information may be recorded on this memory. In this case, a memory reader for reading the reference information is provided in the magnetic tape drive 30, and the control unit 35 may determine next recording addresses based on the reference information read by the memory reader.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A magnetic tape comprising:
    a plurality of servo tracks being recorded on the magnetic tape, the servo tracks which include respective servo signals, and which are arranged lengthwise and adjacent to one another over a whole of a width or a part of the magnetic tape; and
    the servo tracks, each of which includes a plurality of address signals being recorded thereon at predetermined intervals in isolation from the corresponding servo signals, the address signals indicating their respective locations of corresponding one of the servo tracks and their respective lengthwise locations on the magnetic tape, wherein the servo signals are read from the respective servo tracks, and are used to adjust tracking of a magnetic head on the magnetic tape.

2. A magnetic tape according to claim 1,
wherein each of the servo signals includes patterns, each of which is made up of a pair of lines being non-parallel with each other, and which are repeatedly arranged lengthwise.

3. A magnetic tape according to claim 1,
wherein each of the servo signals has an output of which pulse duration gradually differs depending on a breadthwise position of corresponding one of the servo tracks.

4. A magnetic tape according to claim 1,
wherein each of the servo signals has an output of which level gradually differs depending on a breadthwise position of corresponding one of the servo tracks.

5. A magnetic tape cartridge, comprising:
a cartridge case,
a reel being provided in the cartridge case, and
the magnetic tape of claim 1, the magnetic tape being wound around the reel.

6. A magnetic tape cartridge, comprising:
a cartridge case,
a reel being provided in the cartridge case, and
the magnetic tape of claim 2, the magnetic tape being wound around the reel.

7. A magnetic tape cartridge, comprising:
a cartridge case,
a reel being provided in the cartridge case, and
the magnetic tape of claim 3, the magnetic tape being wound around the reel.

8. A magnetic tape cartridge, comprising:
a cartridge case,
a reel being provided in the cartridge case, and
the magnetic tape of claim 4, the magnetic tape being wound around the reel.

9. A magnetic tape cartridge according to claim 5,
wherein the magnetic tape has a part on which reference information is recorded, the reference information including an index of data recorded on the magnetic tape and an address of the data.

10. A magnetic tape cartridge according to claim 6,
wherein the magnetic tape has a part on which reference information is recorded, the reference information including an index of data recorded on the magnetic tape and an address of the data.

11. A magnetic tape cartridge according to claim 7,
wherein the magnetic tape has a part on which reference information is recorded, the reference information including an index of data recorded on the magnetic tape and an address of the data.

12. A magnetic tape cartridge according to claim 8,
wherein the magnetic tape has a part on which reference information is recorded, the reference information including an index of data recorded on the magnetic tape and an address of the data.

13. A magnetic tape cartridge according to claim 9,
wherein the reference information is recorded in a region ranging from a start point of the magnetic tape to a predetermined location thereof.

14. A magnetic tape cartridge according to claim 5, further comprising a contact or non-contact memory on which reference information is recorded, the reference information including an index of data recorded on the magnetic tape and an address of the data.

15. A magnetic tape drive for recording data on the magnetic tape cartridge according to claim 9, the magnetic tape drive comprising:
a magnetic tape running system for running the magnetic tape;
a magnetic head including at least a servo signal read device, a data recording device and a data reproducing device, the servo signal read device for reading the servo signals and the address signals from the magnetic tape, the data recording device for recording data on the magnetic tape, the data reproducing device for reading the data and the reference information from the magnetic tape;
a servo controller for adjusting tracking of the magnetic head on the magnetic tape, based on the servo signals being read by the servo signal read device;
a control unit for controlling the magnetic tape running system and the magnetic head; and
the control unit for determining a next recording address, based on the reference information being read by the data reproducing device, for driving the magnetic tape running system and moving the magnetic head, based on the address signals being read by the servo signal read device, so that the data recording device is positioned at the recording address, and for applying a recording signal to the magnetic head, based on the data to be recorded.

16. A magnetic tape drive for recording data on the magnetic tape cartridge according to claim 10, the magnetic tape drive comprising:
a magnetic tape running system for running the magnetic tape;
a magnetic head including at least a servo signal read device, a data recording device and a data reproducing device, the servo signal read device for reading the servo signals and the address signals from the magnetic tape, the data recording device for recording data on the magnetic tape, the data reproducing device for reading the data and the reference information from the magnetic tape;
a servo controller for adjusting tracking of the magnetic head on the magnetic tape, based on the servo signals being read by the servo signal read device;
a control unit for controlling the magnetic tape running system and the magnetic head; and
the control unit for determining a next recording address, based on the reference information being read by the data reproducing device, for driving the magnetic tape running system and moving the magnetic head, based on the address signals being read by the servo signal read device, so that the data recording device is positioned at the recording address, and for applying a recording signal to the magnetic head, based on the data to be recorded.

17. A magnetic tape drive for recording data on the magnetic tape cartridge according to claim 11, the magnetic tape drive comprising:
a magnetic tape running system for running the magnetic tape;
a magnetic head including at least a servo signal read device, a data recording device and a data reproducing device, the servo signal read device for reading the servo signals and the address signals from the magnetic tape, the data recording device for recording data on the magnetic tape, the data reproducing device for reading the data and the reference information from the magnetic tape;

a servo controller for adjusting tracking of the magnetic head on the magnetic tape, based on the servo signals being read by the servo signal read device;

a control unit for controlling the magnetic tape running system and the magnetic head; and the control unit for determining a next recording address, based on the reference information being read by the data reproducing device, for driving the magnetic tape running system and moving the magnetic head, based on the address signals being read by the servo signal read device, so that the data recording device is positioned at the recording address, and for applying a recording signal to the magnetic head, based on the data to be recorded.

18. A magnetic tape drive for recording data on the magnetic tape cartridge according to claim 12, the magnetic tape drive comprising:

a magnetic tape running system for running the magnetic tape;

a magnetic head including at least a servo signal read device, a data recording device and a data reproducing device, the servo signal read device for reading the servo signals and the address signals from the magnetic tape, the data recording device for recording data on the magnetic tape, the data reproducing device for reading the data and the reference information from the magnetic tape;

a servo controller for adjusting tracking of the magnetic head on the magnetic tape, based on the servo signals being read by the servo signal read device;

a control unit for controlling the magnetic tape running system and the magnetic head; and the control unit for determining a next recording address, based on the reference information being read by the data reproducing device, for driving the magnetic tape running system and moving the magnetic head, based on the address signals being read by the servo signal read device, so that the data recording device is positioned at the recording address, and for applying a recording signal to the magnetic head, based on the data to be recorded.

19. A magnetic tape drive for recording data on the magnetic tape cartridge according to claim 14, the magnetic tape drive comprising:

a magnetic tape running system for running the magnetic tape;

a magnetic head including at least a servo signal read device, a data recording device and a data reproducing device, the servo signal read device for reading the servo signals and the address signals from the magnetic tape, the data recording device for recording data on the magnetic tape, the data reproducing device for reading the data and the reference information from the magnetic tape;

a servo controller for adjusting tracking of the magnetic head on the magnetic tape, based on the servo signals being read by the servo signal read device;

a control unit for controlling the magnetic tape running system and the magnetic head; and the control unit for determining a next recording address, based on the reference information being read by the data reproducing device, for driving the magnetic tape running system and moving the magnetic head, based on the address signals being read by the servo signal read device, so that the data recording device is positioned at the recording address, and for applying a recording signal to the magnetic head, based on the data to be recorded.

20. A magnetic tape drive according to claim 19, wherein the data recording device overwrites data on the servo signals and the address signals, thereby recording the data.

21. A method for recording data on the magnetic tape by use of a magnetic head, the magnetic head including a servo signal read device, a data recording device and a data reproducing device, the method comprising:

providing a magnetic tape cartridge;

reading reference information by use of the data reproducing device to determine a next recording address;

running the magnetic tape and moving the magnetic head, based on address signals being read by the servo signal read device, so that the data recording device is positioned at the next recording address; and applying a recording signal to the data recording device, based on data to be recorded, thereby recording data on the magnetic tape, wherein the magnetic tape cartridge comprises:

a cartridge case;

a reel being provided in the cartridge case;

a magnetic tape, which is wound around the reel, comprising:

a plurality of servo tracks being recorded on the magnetic tape, the servo tracks which include respective servo signals, and which are arranged lengthwise and adjacent to one another over a whole of a width or a part of the magnetic tape; and the servo tracks, each of which includes a plurality of address signals being recorded thereon at predetermined intervals in isolation from the corresponding servo signals, the address signals indicating their respective locations of corresponding one of the servo tracks and their respective lengthwise locations on the magnetic tape, wherein the servo signals are read from the respective servo tracks, and are used to adjust tracking of a magnetic head on the magnetic tape; and contact or non-contact memory on which reference information is recorded, the reference information including an index of data recorded on the magnetic tape and an address of the data.

22. A method for recording data according to claim 21 wherein the data is recorded by being overwritten on the servo signals and the address signals being included in the servo tracks.

23. The magnetic tape of claim 1, wherein the respective servo signals do not extend into adjacent servo tracks.

24. The magnetic tape of claim 1, wherein the servo tracks extend substantially a full length of the magnetic tape without interruption.

25. The magnetic tape of claim 1, wherein the magnetic tape has a part on which reference information is recorded, the reference information including an index of data recorded on the magnetic tape and an address of the data.

26. A magnetic tape comprising:

a plurality of servo tracks recorded on the magnetic tape, the servo tracks arranged lengthwise and adjacent to one another over at least a portion of the magnetic tape, each of the servo tracks comprising:

a plurality of servo signals recorded thereon; and
a plurality of address signals recorded thereon,
wherein the address signals indicate a location of the respective servo track on the magnetic tape and a respective lengthwise location on the magnetic tape, and wherein the magnetic tape has a part on which reference information is recorded, the reference information including an index of data recorded on the magnetic tape and an address of the data.

* * * * *